United States Patent [19]
Dezzani et al.

[11] Patent Number: 5,507,580
[45] Date of Patent: Apr. 16, 1996

[54] ROD END BEARING FOR AIRCRAFT USE

[75] Inventors: Michael M. Dezzani, Torrington; Philip K. Pearson, Farmington, both of Conn.

[73] Assignee: The Torrington Company, Torrington, Conn.

[21] Appl. No.: 357,674

[22] Filed: Dec. 16, 1994

[51] Int. Cl.[6] ..................................................... F16C 19/02
[52] U.S. Cl. ........................... 384/492; 384/625; 384/913
[58] Field of Search ..................................... 384/492, 450, 384/903, 912, 625, 913, 569

[56] References Cited

U.S. PATENT DOCUMENTS

| 1,902,676 | 3/1933 | Sutton et al. | |
|---|---|---|---|
| 1,917,842 | 7/1933 | Johnson . | |
| 1,930,388 | 10/1933 | Hatfield . | |
| 3,647,572 | 3/1972 | Todd et al. . | |
| 4,324,441 | 4/1982 | Rouverol et al. | 384/903 |
| 4,871,268 | 10/1989 | Furumura et al. | 384/912 |
| 4,942,059 | 7/1990 | Wilson | 427/53.1 |
| 5,122,000 | 6/1992 | Matsumoto et al. | 384/492 |
| 5,137,375 | 8/1992 | Murakami et al. | 384/450 |
| 5,211,768 | 5/1993 | Preisser et al. | 148/230 |

*Primary Examiner*—Lenard A. Footland
*Attorney, Agent, or Firm*—John C. Bigler

[57] ABSTRACT

The ball raceways on the inside surface of the outer ring of a rod end bearing to be used on aircraft is hardened by a nitriding process while at the same time leaving the remainder of the ring soft and ductile to resist fracture.

3 Claims, 1 Drawing Sheet

ROD END BEARING FOR AIRCRAFT USE

BACKGROUND OF THE INVENTION

This invention relates to rod end bearings for use on aircraft. More particularly, this invention is a new rod end bearing which includes rolling element raceways having a hardened raceway surface and raceway sub-surface zone and a method of making the rod end bearing.

A big problem with rod end bearings for aircraft applications is corrosion. However, it is very important that the raceway surface and sub-surface zone near the raceway must be hard enough to withstand the rolling contact stressing the bearing along the outer ring bearing raceway. Generally, steels which are very resistive to corrosion make very poor rolling element bearing raceway surfaces; and steels which make good bearing raceway surfaces tend to have poor corrosion resistance. In addition, though the bearing raceway surface and sub-surface zone of the outer ring must have high hardness, the remainder of the ring and its integral shank must be soft and ductile to resist fracture.

The foregoing illustrates limitations known to exist in present devices and methods. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing raceway surface and sub-surface zone of the outer ring with high rolling contact hardness while the remainder of the ring and its integral shank is kept soft and ductile to resist fracture. The rod end bearing has a rotatable inner ring with at least one raceway around its outside surface. A stationary outer ring has at least one raceway around its inside surface. The inside surface of the stationary outer ring has a larger diameter than the diameter of the outside surface of the rotatable inner ring. The outer ring has an integral shank. A plurality of rolling elements are located in the annular space separating the inner and outer rings and in rolling contact with the inner ring and outer ring raceways. The outer ring and the integral shank are made of a low carbon martensitic stainless steel material and the stationary outer ring raceways surface and sub-surface zones are hardened by a nitriding process to provide a rod end bearing having an outer ring with a high rolling contact hardness raceway while the remainder of the outer ring and shank is relatively soft and ductile to resist fracture.

In the process of making the outer ring and shank, the low carbon martensitic stainless steel is selectively hardened at the outer ring inside surface to provide the hardened ball raceways.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various Figures like parts are referred to by like numbers.

Figure 1:
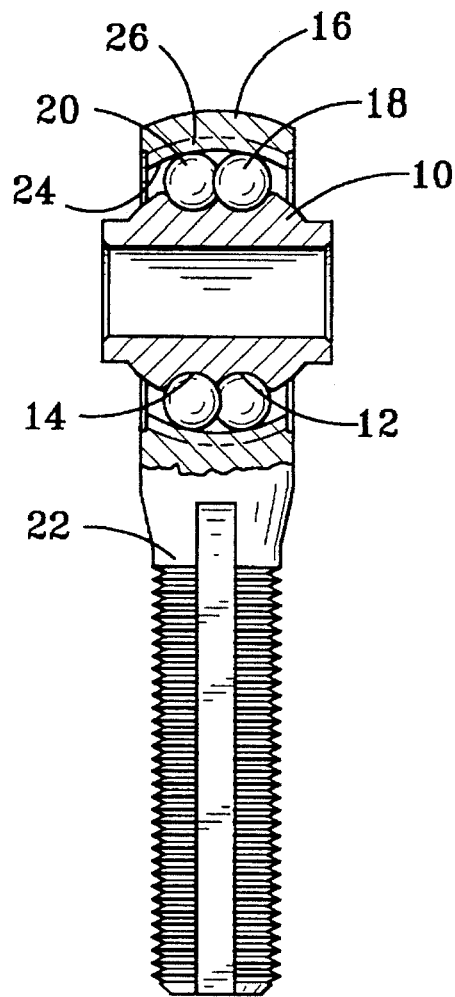
FIG. 1 is a side elevational view, with parts broken away to show details of construction, illustrating an embodiment of the rod end bearing of the present invention.

Referring to the drawings and more particularly to FIG. 1, the rod end bearing for use on aircraft includes a rotatable inner ring 10 having rolling element raceways 12 and 14 around its outside surface. A stationary outer ring 16 surrounds the rotatable inner ring 10. The inside surface of the stationary outer ring has a larger diameter than the diameter of the outside surface of the rotatable inner ring, thus providing an annular space separating the inner and outer rings. A first set of rolling elements 18 is located in the annular space separating the inner and outer rings and are in rolling contact with the inner ring rolling element raceway 12 and the inside surface of the outer ring 16. A second set of rolling elements 20 is located in the annular space separating the inner and outer rings and in rolling contact with the inner ring ball raceway 14 and the inside surface of the outer ring 16.

Although the illustrated embodiment includes two rows of rolling elements within two raceways, other configurations with one or more rows of rolling elements may be used. The rolling elements may be balls, as illustrated, or rollers of cylindrical or other configurations. The integral shank may be solid or internally drilled and threaded as illustrated.

Figure 2:
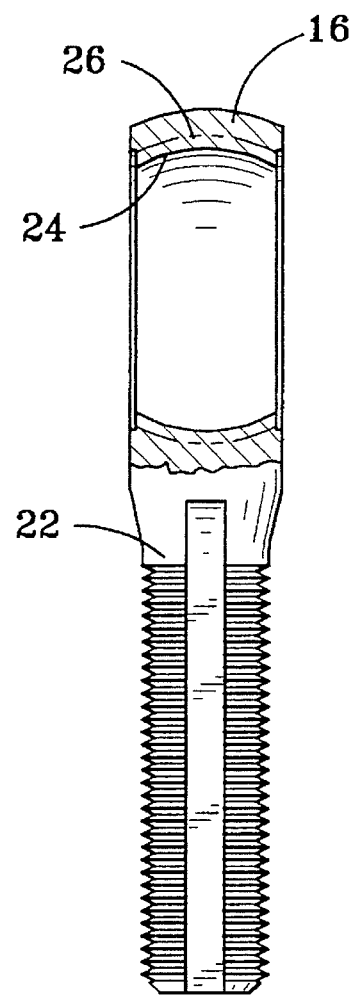
FIG. 2 is a side elevational view partly in section showing the outer ring and integral shank of the rod end bearing of FIG. 1.
Figure 3:
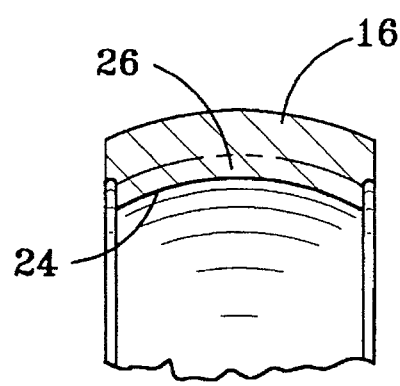
FIG. 3 is a fragmentary view of the outer ring and integral shank shown in FIG. 2 but on a larger scale.

As seen in FIG. 1 and FIG. 2 the outer ring has an integral shank 22. The outer ring 16 with its integral shank 22 is made of a low carbon martensitic stainless steel. Preferably the low carbon martensitic stainless steel has from 0.1 weight percent to 0.3 weight percent carbon and from 10 weight percent to 12 weight percent chromium. Other alloys with up to 18 weight percent chromium may also be used. The inside surface 24 (see FIG. 3) and the sub-surface zone 26 have been hardened by a nitriding process.

The from 10 weight percent to 18 weight percent chromium makes the shank and the non-hardened portion of the outer ring resistive to corrosion. Normally, alloys with less than about 10 weight percent chromium lack sufficient corrosion resistance.

It has been found that the use of the low carbon stainless steel base material and the use of nitrogen to achieve high hardness in the rolling contact zone provide a better corrosion resistance than the conventional process of making rod end bearings using a higher carbon content such as 1 weight percent carbon. Also, the conventionally used carburizing, hardening, and tempering are eliminated. Also, the nitriding is performed at a relatively low temperature (850 degrees F.–1200 degrees F.) so distortion due to this process is minimal allowing less grinding stock on the outer ring.

In carrying out the process of hardening the desired portion of the outer ring, the areas of the outer ring and shank which you do not want to harden can be masked by many conventional ways known in the art for masking materials such as by putting a copper plate on the areas which you do not want to harden. Thus, the nitriding process will only harden the unmasked area; this area, of course, being the appropriate portions of the outer ring inside surface to provide hardened ball raceways.

Having described the invention, what is claimed is:

1. A rod end bearing for use on aircraft comprising:

a rotatable inner ring having at least one ball raceway around its outside surface;

a stationary outer ring having at least one ball raceway around its inside surface, the inside surface having a larger diameter than the diameter of the outside surface of the rotatable inner ring;

said stationary outer ring having an integral shank;

a plurality of balls located in the annular space separating the inner and outer rings and in rolling contact with the inner ring and outer ring ball raceways;

the outer ring and the integral shank being made of a martensitic stainless steel with said stationary outer ring ball raceway having a surface and a sub-surface zone hardened by a nitriding process thus providing a rod end bearing having an outer ring with a high rolling contact hardness raceway while the remainder of the outer ring and shank is relatively soft and ductile to resist fracture.

2. A rod end bearing for use on aircraft in accordance with claim 1 wherein:

the martensitic stainless steel has from 0.1 weight percent to 0.3 weight percent carbon and from 10 weight percent to 18 weight percent chromium.

3. A rod end bearing for use on aircraft in accordance with claim 1 wherein:

the martensitic stainless steel has from 0.1 weight percent to 0.3 weight percent carbon and from 10 weight percent to 12 weight percent chromium.

* * * * *